(12) United States Patent
Lambson et al.

(10) Patent No.: US 8,766,754 B2
(45) Date of Patent: Jul. 1, 2014

(54) CONCAVE NANOMAGNETS WITH WIDELY TUNABLE ANISOTROPY

(75) Inventors: Brian Lambson, Berkeley, CA (US); Zheng Gu, Emeryville, CA (US); David Carlton, Berkeley, CA (US); Jeffrey Bokor, Piedmont, CA (US)

(73) Assignee: The Regents of the University of California, Oakland, CA (US)

( * ) Notice: Subject to any disclaimer, the term of this patent is extended or adjusted under 35 U.S.C. 154(b) by 51 days.

(21) Appl. No.: 13/551,764

(22) Filed: Jul. 18, 2012

(65) Prior Publication Data

US 2014/0022036 A1    Jan. 23, 2014

(51) Int. Cl.
    *H01F 7/02*    (2006.01)
(52) U.S. Cl.
    USPC ............................ 335/306; 977/838; 977/960
(58) Field of Classification Search
    None
    See application file for complete search history.

(56) References Cited

U.S. PATENT DOCUMENTS

| | | | |
|---|---|---|---|
| 6,567,540 B2 | 5/2003 | Balaban et al. | |
| 6,614,084 B1 | 9/2003 | Cowburn et al. | |
| 6,774,391 B1 | 8/2004 | Cowburn | |
| 6,867,988 B2 | 3/2005 | Cowburn | |
| 7,120,049 B2 | 10/2006 | Nakamura et al. | |
| 7,126,848 B2 | 10/2006 | Nakamura et al. | |
| 7,175,778 B1 | 2/2007 | Bhargava et al. | |
| 7,411,263 B2 * | 8/2008 | Nakayama et al. | 257/421 |
| 7,502,244 B2 * | 3/2009 | Cowburn | 365/14 |
| 7,644,489 B2 | 1/2010 | Arora et al. | |
| 8,193,598 B2 * | 6/2012 | Eshaghian-Wilner et al. | 257/427 |
| 2004/0027899 A1 * | 2/2004 | Cowburn | 365/222 |
| 2006/0091914 A1 | 5/2006 | Bourianoff et al. | |
| 2006/0198184 A1 * | 9/2006 | Yoda et al. | 365/171 |
| 2006/0222896 A1 * | 10/2006 | Inomata et al. | 428/826 |
| 2007/0054154 A1 | 3/2007 | Leu | |
| 2007/0183188 A1 | 8/2007 | Kim et al. | |

OTHER PUBLICATIONS

Alam, M. T. et al., "Clocking Scheme for Nanomagnet QCA," Proceedings of the 7th IEEE International Conference on Nanotechnology, Aug. 2-5, 2007, Hong Kong, pp. 403-408.
Behin-Aein, B. et al., "Switching Energy of Ferromagnetic Logic Bits," arXiv:0804.1389, Apr. 9, 2008.
Berling, P. et al, "Magnetization Reversal Mechanisms in Epitaxial FE/SI(0 0 1) Layers with Twofold and Fourfold Magnetic Anisotropies," Journal of Magnetism and Magnetic Materials, 2001, pp. 181-190, vol. 237, Elsevier Science B.V.
Bernstein, G.H. et al., "Magnetic QCA Systems," Microelectronics Journal, available online May 31, 2005, vol. 36, pp. 619-624.
Cowburn, R. P., "Probing Antiferromagnetic Coupling Between Nanomagnets," Physical Review B, 2002, pp. 1-4, vol. 65, No. 092409, The American Physical Society.
Cowburn, R. P. et al., "Room Temperature Magnetic Quantum Cellular Automata," Science, 2000, pp. 1466-1468, vol. 287, American Association for the Advancement of Science.

(Continued)

*Primary Examiner* — Mohamad Musleh
(74) *Attorney, Agent, or Firm* — Withrow & Terranova, P.L.L.C.

(57) ABSTRACT

A nanomagnet having widely tunable anisotropy is disclosed. The disclosed nanomagnet is a magnetic particle with a convex shape having a first magnetically easy axis. The convex shape is modified to include at least one concavity to urge a second magnetically easy axis to form substantially offset from the first magnetically easy axis. In at least one embodiment, the convex shape is also modified to include at least one concavity to urge a second magnetically easy axis to form with a magnetic strength substantially different from the first magnetically easy axis.

27 Claims, 10 Drawing Sheets

(56) References Cited

OTHER PUBLICATIONS

Csaba, G. et al., "Nanocomputing by Field-Coupled Nanomagnets," IEEE Transactions on Nanotechnology, Dec. 2002, vol. 1, No. 4, IEEE, pp. 209-213.

Csaba, G. et al., "Power Dissipation in Nanomagnetic Logic Devices," 4th IEEE Conference on Nanotechnology, 2004, pp. 346-348.

Csaba, G. et al.,"Simulation of Power Gain and Dissipation in Field-Coupled Nanomagnets," Journal of Computational Electronics, 2005, vol. 4, pp. 105-110.

Imre, A. et al., "Investigation of Shape-Dependent Switching of Coupled Nanomagnets," Superlattices and Microstructures, 2003, vol. 34, Elsevier Ltd, pp. 513-518.

Imre, A. et al., "Majority Logic Gate for Magnetic Quantum-Dot Cellular Automata," Science, 2006, vol. 311, American Association for the Advancement of Science, pp. 205-208.

Kowalewski, M. et al., "Thickness and Temperature Dependence of Magnetic Anisotropies in Ultrathin fcc Co (001) Structures," Physical Review B, The American Physical Society, Apr. 1993, vol. 47, No. 14, pp. 8748-8753.

Lee, F. S., "Shape-Induced Biaxial Anisotropy in Thin Magnetic Films," IEEE Transactions on Magnetics, Sep. 1968, vol. Mag-4, No. 3, IEEE, pp. 502-506.

Niemier, M. et al., "Bridging the Gap Between Nanomagnetic Devices and Circuits," IEEE International Conference on Computer Design (ICCD), Oct. 12, 2008, pp. 506-513.

Niemier, M. et al., "Clocking Structures and Power Analysis for Nanomagnet-Based Logic Devices," Proceedings of the 2007 International Symposium on Low Power Electronics and Design, Aug. 27-29, 2007, Portland, OR, USA: ACM, 2007, pp. 26-31.

Nikonov, D. E. et al., "Simulation of Highly Idealized, Atomic Scale Magnetic Quantum Cellular Automata Logic Circuits," Journal of Nanoelectronics and Optoelectronics, Mar. 2008, vol. 3, No. 1, pp. 3-11.

Parish, M. C. B. et al., "Physical Constraints on Magnetic Quantum Cellular Automata," Applied Physics Letters, Sep. 8, 2003, vol. 83, No. 10, American Institute of Physics, pp. 2046-2048.

Yang, T. et al., "Giant Spin-Accumulation Signal and Pure Spin-Current-Induced Reversible Magnetization Switching," Nature Physics, Nov. 2008, vol. 4, pp. 851-854.

Office Action mailed Mar. 30, 2011 for U.S. Appl. No. 12/131,669, now Patent No. 8,134,441, 22 pages.

Notice of Allowance mailed Aug. 31, 2011, for U.S. Appl. No. 12/131,669, now Patent No. 8,134,441,9 pages.

Notice of Allowance mailed Sep. 2, 2011, for U.S. Appl. No. 12/505,898, now U.S. Patent No. 8,138,874,13 pages.

Cowburn, R. et al., "A new technique for measuring magnetic anisotropies in thin and ultrathin films by magneto-optics," Journal of Applied Physics, May 15, 1997, vol. 81, No. 10, pp. 6879-6883.

Cowburn, R. et al., "Configurational anisotropy in nanomagnets," Physical Review Letters, Dec. 14, 1998, vol. 81, No. 24, pp. 5414-5417.

Vavassori, P. et al., "Interplay between magnotocrytalline and configurational anisotropies in Fe(001) square nanostructures," Physical Review B, vol. 72, Aug. 2005, 8 pages.

Cowburn, R. et al., "Property variation with shape in magnetic nanoelements," Journal of Physics D: Applied Physics, 2000, vol. 33, No. 1, 16 pages.

Behin-Aein, B. et al., "Proposal for an all-spin logic device with built-in memory," Nature Nanotechnology, vol. 5, Feb. 28, 2010, pp. 266-270.

Parkin, S. S. P. et al., "Magnetic domain-wall racetrack memory," Science, vol. 320, Apr. 2008, pp. 190-194.

Koltsov, D. K. et al., "Control of micromagnetics in Permalloy nanomagnets by means of indentation," Journal of Applied Physics, vol. 94, No. 5 Sep. 1, 2003, pp. 3457-3461.

Donahue, M. et al., "OOMMF User's Guide," Version 1.2a3, Oct. 30, 2002, National Institute of Standards and Technology, 175 pages.

Lambson, B. et al., "Exploring the thermodynamic limits of computation in integrated systems: magnetic memory, nanomagnetic logic, and the Landauer limit," Physical Review Letters, vol. 107, Jul. 2011, 4 pages.

Carlton, D. et al., "Computing in thermal equilibrium with dipole-coupled nanomagnets," IEEE Transactions on Nanotechnology, vol. 10, No. 6, Nov. 2011, pp. 1401-1404.

Carlton, D. et al., "Simulation studies of nanomagnet-based logic architecture," Journal of Nano Letters, vol. 8, 2008, pp. 4173-4178.

\* cited by examiner

DEMAG. ENERGY (kJ/m³)

CONCAVE NANOMAGNETS WITH WIDELY TUNABLE ANISOTROPY

GOVERNMENT FUNDING

This invention was supported in part by the DARPA Non-Volatile Logic Program, the Western Institute of Nanoelectronics (WIN) and the Center for Energy Efficient Electronics Sciences (NSF Award Number ECCS-0939514). Work at the Molecular Foundry and the Advanced Light Source, Lawrence Berkeley National Laboratory was supported by the Director, Office of Science, Office of Basic Energy Sciences, Division of Materials Sciences and Engineering of the US Department of Energy under Contract No. DE-AC02-OSCI-II 1231. The United States Government has certain rights in this invention.

CROSS-REFERENCE TO RELATED APPLICATIONS

This application is related to U.S. application Ser. No. 12/505,898 filed Jul. 20, 2009, now U.S. Pat. No. 8,138,874 entitled "NANOMAGNETIC REGISTER" and to U.S. application Ser. No. 12/131,669 filed Jun. 2, 2008, now U.S. Pat. No. 8,134,441 entitled "NANOMAGNETIC SIGNAL PROPAGATION AND LOGIC GATES", the entireties of which are incorporated herein by reference.

FIELD OF THE DISCLOSURE

The present disclosure generally relates to nanomagnetic signal propagation in information processing systems, and in particular relates to nanomagnets having widely tunable anisotropy properties.

BACKGROUND

There is interest in exploring the use of nanometer-scale magnets, or nanomagnets, in signal propagation in information processing systems. There has been some limited success in propagating a signal along a row of nanomagnets. A force is applied to a row of nanomagnets to cause the magnetization direction of each nanomagnet to align with its relatively unstable hard axis, and then the force is removed. The magnetization direction of a first nanomagnet in the row of nanomagnets is perturbed to cause the magnetization direction of the first nanomagnet to align with its relatively stable magnetically easy axis. Magnetic dipole field coupling between adjacent nanomagnets ideally causes a cascade of anti-parallel alignment of magnetization directions along the row of nanomagnets. However, cascade success depends on the magnetization direction of each nanomagnet staying in its relatively unstable magnetically hard-axis alignment until perturbed by the dipole field of the signal propagating from an adjacent nanomagnet. Experiments have shown that variables such as thermal fluctuations, transient electromagnetic fields, and lithographic inconsistencies can affect hard-axis stability and cause the magnetization direction in a nanomagnet to prematurely align with its magnetically easy axis, ruining the reliability of the cascade. Thus, there is a need to increase magnetically hard-axis magnetization stability in nanomagnets to increase the reliability of signal propagation.

SUMMARY

The present disclosure provides a nanomagnet having widely tunable anisotropy. The disclosed nanomagnet is a magnetic particle with a convex shape having a first magnetically easy axis. The convex shape is modified to include at least one concavity to urge a second magnetically easy axis to form substantially offset from the first magnetically easy axis. In another embodiment, a nanomagnet is provided with tunable anisotropy comprising a magnetic particle with a convex shape having a first magnetically easy axis, wherein the convex shape is modified to include at least one concavity to urge a second magnetically easy axis to form with a magnetic strength substantially different from the first magnetically easy axis.

In an exemplary embodiment, an apparatus for propagating magnetic signals is disclosed. The apparatus includes a substrate on which a chain of nanomagnets is fabricated. Each of the chain of nanomagnets is made up of a magnetic particle with a convex shape having a first magnetically easy axis, wherein the convex shape includes at least one concavity to urge a second magnetically easy axis to form substantially offset from the first magnetically easy axis. Each of the chain of nanomagnets is separated by a distance that is close enough to allow a magnetization change in one of the chain of nanomagnets to cause adjacent ones of the chain of nanomagnets to change magnetization, thereby propagating a magnetic signal.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Nanomagnets typically have a relatively stable magnetic axis known as a magnetically easy axis and a relatively unstable magnetic axis known as a magnetically hard axis. The present disclosure provides a nanomagnetic logic architecture in which nanomagnets remain magnetized along what would normally be their magnetically hard axis until triggered to flip to their magnetically easy axis by the dipole field of their nearest neighbor. The requirement for this architecture to work is that each nanomagnet must exhibit dual-axis remanence, which provides zero-field stability along two orthogonal axes. This disclosure shows that remanence is a property that can be attained by engineering anisotropy properties of individual nanomagnets.

Anisotropy in magnetic materials refers to a tendency to align magnetically in particular preferred directions. For the purpose of this disclosure, concave nanomagnets with widely tunable anisotropy properties are nanoscale magnetic elements in which an anisotropy profile can be broadly controlled by the presence of at least one concavity along one or more of the nanomagnet's sides. The tunable anisotropy properties arise not from altering the nominal dimensions such as length, width, and height or the material of the magnet, but rather from altering the depth of the at least one concavity. Experiments conducted in accordance with the present disclosure achieved up to 700% enhancement of the anisotropy strength in Fe-Ni based alloy (permalloy) nanomagnet squares with concave shapes in comparison with normal squares, as well as control over the direction of the magnetically easy axis. In addition, a design was verified pertaining to the functionality of a concave rectangle having a tunable composition of uniaxial and biaxial anisotropy. In particular, the applicability of concave nanomagnets with regard to nanomagnetic logic was tested.

Measurement techniques based on the magneto-optical Kerr effect (MOKE) for characterizing anisotropy in single domain nanomagnets are usable to investigate the role of a nanomagnet's shape, size, and crystallinity on its anisotropy. In convex shaped nanomagnets, energetically favorable non-uniform magnetization patterns are found to induce configurational anisotropy with magnetically easy axes oriented towards either the corners or edges of the convex shape, depending on a film thickness making up the nanomagnets. For the purposes of this disclosure and the claims that follow, the term "convex shape(s)" include convex polygons and shapes that bulge outward. A convex polygon is any polygon that has interior angles that are each strictly less than 180°.

The above results imply that an ability to tune the anisotropy properties of the nanomagnet by changing its lithographically defined shape is available. A wide tuning of anisotropy properties provides for broad applicability to magnetic devices such as spin-based computational devices. However, a relatively small number of adjustable parameters in simple shapes such as rectangles, and squares has thus far limited applications of configurational anisotropy.

Configurational anisotropy arises in single domain nanomagnets that adopt a non-uniform magnetization pattern to minimize magnetic charge at interfaces. The energy landscape in configuration space may contain local minima that do not exist when considering the case of uniform magnetization only, leading to complex anisotropy properties. One way to determine the approximate strength of configurational anisotropy in a particular shape is to associate an effective anisotropy field with each magnetization angle. If the anisotropy is predominantly uniaxial or biaxial, then the difference between the maximum and the minimum strength of the anisotropy field is related to the anisotropy energy density K which is given by the following equation.

$H_{anis} = 2K/M_S$, where $M_S$ is the saturation magnetization of the material.

Past investigations of permalloy squares of 150 nm width and 15 nm thickness have demonstrated a biaxial anisotropy field of over 300 Oersted, with magnetically easy axes oriented along the square diagonals.

One embodiment of the present disclosure provides a rectangle-derived nanomagnet shape, which has concavities along its two short edges (top and bottom) to obtain the desired anisotropy properties for nanomagnetic logic applications. As in an elliptical nanomagnet, the magnetically easy axis lies parallel to the long axis. However, unlike an elliptical nanomagnet, the concavities induce an additional magnetically easy axis along what is ordinarily the magnetically hard axis. To demonstrate this experimentally, large (1×1 mm) arrays of nominally identical nanomagnets were fabricated using electron beam lithography followed by metal evaporation.

Figure 1:
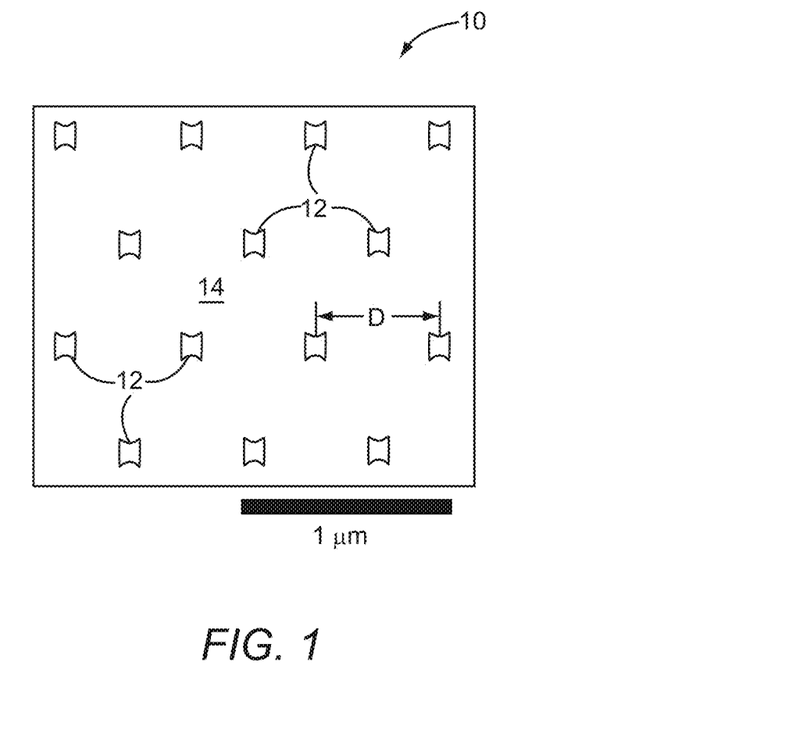
FIG. 1 is a diagram showing an array section of nominally identical nanomagnets that are in accordance with the present disclosure.

FIG. 1 is a diagram showing an array section 10 of nominally identical nanomagnets 12. The center-to-center spacing (D) between nanomagnets is 750 nm. The nanomagnets 12 were defined by electron beam lithography using a silicon substrate 14 and polymethyl-methacrylate (PMMA) resist (not shown). After development in a solution of 7:3 isopropanol:water at −5° C., a film of 10 nm $Ni_{80}Fe_{20}$ followed by 2 nm Al was deposited by electron beam evaporation. Next, the pattern was lifted off using a photoresist remover. The electron beam lithography was performed using an electron beam lithography tool having a 100 kV high brightness gun, a 50 MHz/20 bit intelligent pattern generator, a large field size capability of 1.2 mm at both 50 kV and 100 kV operation, and the capability of generating less than 10 nm lithography.

The anisotropy properties of the finished arrays of nanomagnets were characterized using a MOKE magnetometer configured to perform modulated field magnetic anisometry (MFMA) measurements. The measurement yields the angular dependence of the anisotropy strength in the plane of the nanomagnets; maxima in the anisotropy profile indicate magnetically easy axes and minima indicate hard axes. Because configurational anisotropy depends on the non-uniform magnetization of the nanomagnets and requires each spin to be treated as an independent variable, quantifying cubic and uniaxial anisotropy parameters, as is done for uniformly magnetized particles, is not possible.

Figure 2A:
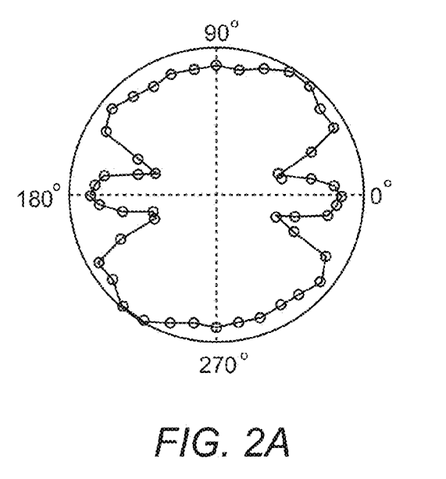
FIG. 2A is an experimental anisotropy profile of a permalloy concave nanomagnet having a rectangle shape.
Figure 2B:
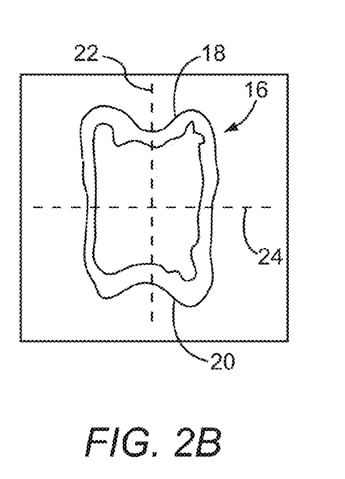
FIG. 2B is an outline of a contour line sketch of a scanning electron micrograph of the permalloy concave nanomagnet having the experimental anisotropy profile shown in FIG. 2A.

FIG. 2A is an experimental anisotropy profile of a rectangular shaped permalloy concave nanomagnet 16 shown in FIG. 2B. The concave nanomagnet 16 has a concavity 18 on one end and another concavity 20 on an opposing end. The concave nanomagnet 16 has a first magnetically easy axis 22 that is a longitudinal axis and a second magnetically easy axis 24 that is a minor axis that is perpendicular to the first magnetically easy axis 22. Note that the first magnetically easy axis that is the longitudinal axis bisects or substantially bisects the concavities 18 and 20. The second magnetically easy axis 24 is denoted by the lobes that extend along the horizontal (0° to 180°) direction of the experimental anisotropy profile of FIG. 2A. If the lobes were absent, the minor axis of the permalloy concave nanomagnet would be considered a magnetically hard axis.

Figure 3A:
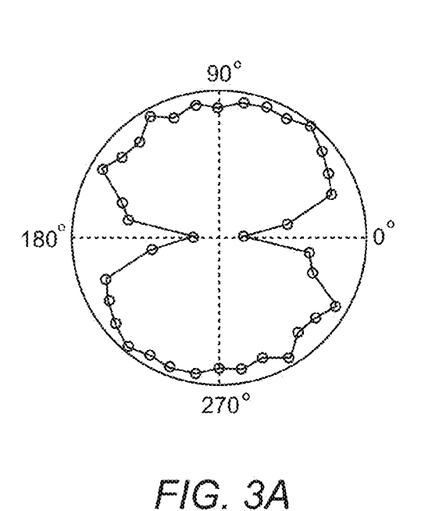
FIG. 3A is an experimental anisotropy profile of a permalloy concave nanomagnet having the shape of an ellipse.
Figure 3B:
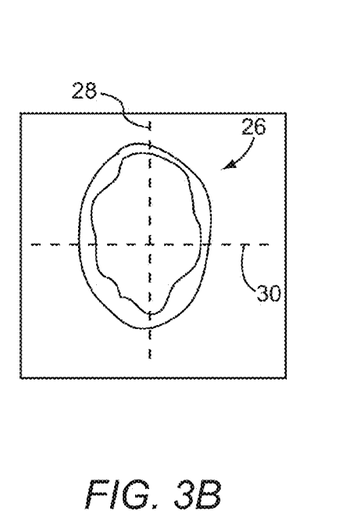
FIG. 3B is an outline of a contour line sketch of a scanning electron micrograph of the permalloy concave nanomagnet having the experimental anisotropy profile shown in FIG. 3A.

FIG. 3A is an experimental anisotropy profile of an ellipse shaped permalloy nanomagnet 26 shown in FIG. 3B. The nanomagnet 26 has a magnetically easy axis 28 that is a longitudinal axis and a magnetically hard axis 30 that is a minor axis that is perpendicular or substantially perpendicular to the magnetically easy axis 28. The magnetically hard axis 30 is denoted by the lack of lobes along the 0° to 180° direction of the experimental anisotropy profile of FIG. 3A.

The concave nanomagnet 16 and the nanomagnet 26 both have nominal dimensions of 80 nm x 120 nm with a 10 nm thickness. The longitudinal axes of both the concave nanomagnet 16 and the nanomagnet 26 are dominant magnetically easy axes. Only the concave nanomagnet 16 with its rectangular shape includes a minor magnetically easy axis in the horizontal direction.

Figure 4:
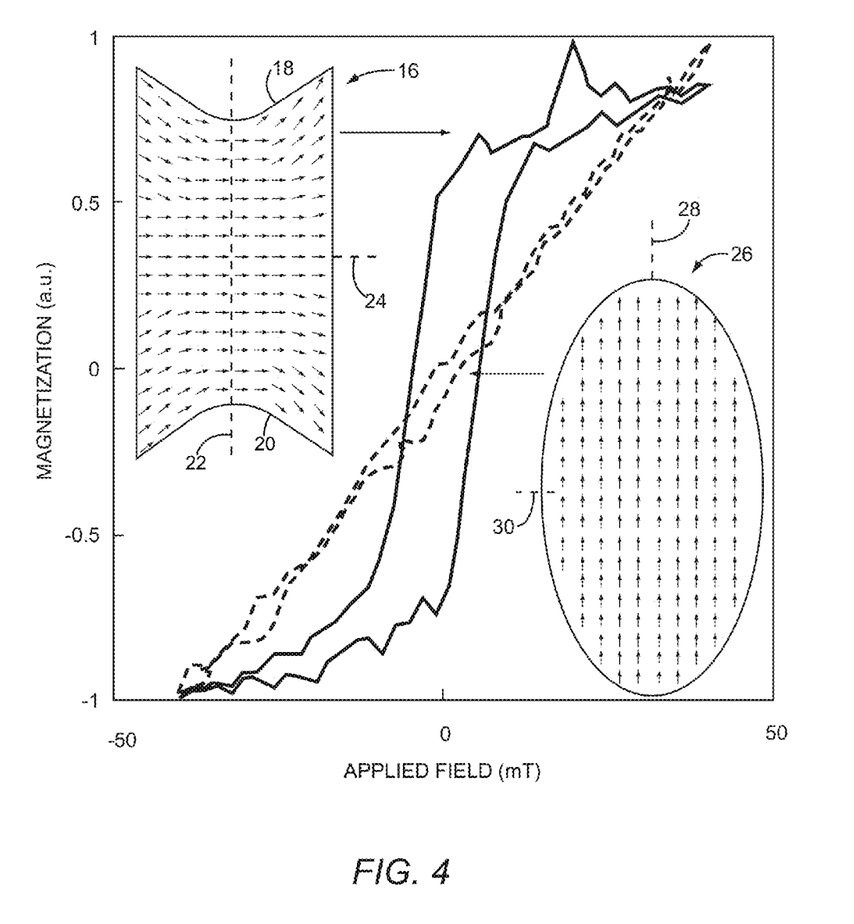
FIG. 4 is a diagram depicting hysteresis loops representing magneto-optical Kerr effect (MOKE) magnetometry measurements along the second magnetically easy axis of the concave nanomagnet as well as along the magnetically hard axis of the ellipse nanomagnet.

FIG. 4 is a diagram depicting hysteresis loops representing MOKE magnetometry measurements along the second magnetically easy axis 24 of the concave nanomagnet 16 as well as along the magnetically hard axis 30 of the nanomagnet 26. The hysteresis loop depicted in solid line represents an MFMA signal in arbitrary units (a.u.) versus applied field (mT) for the concave nanomagnet 16. The hysteresis loop depicted in dashed line represents magnetization in a.u. versus applied field (mT) for the nanomagnet 26. In FIG. 4, arrows represent directions of magnetic fields for both the concave nanomagnet 16 and the nanomagnet 26.

Unlike ellipsoidal nanomagnets such as nanomagnet 26, concave nanomagnets such as concave nanomagnet 16 exhibit hysteresis along what would normally be a magnetically hard axis, while both exhibit hysteresis along their magnetically easy axis. The observation of dual-axis remanence implies that the anisotropy energy barriers that separate the two stable axes are significantly larger than the thermal energy, kT, at room temperature.

Figure 5A:
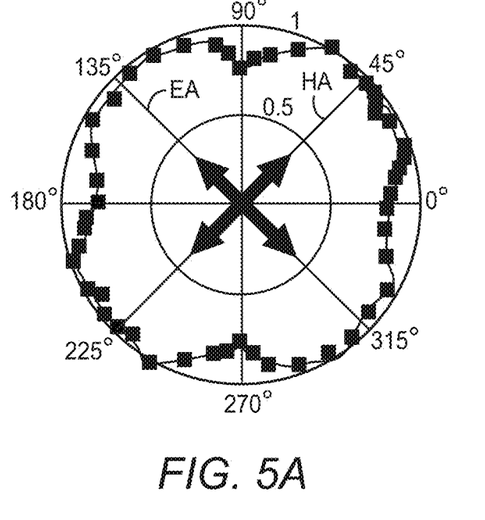
FIG. 5A is an experimental anisotropy profile of a permalloy concave nanomagnet having a substantially square shape without concavities.
Figure 5B:
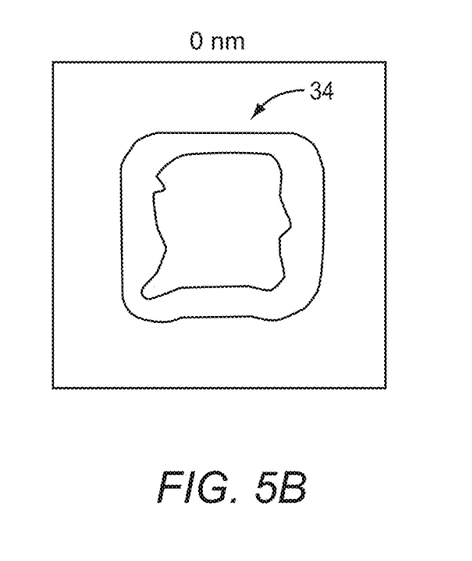
FIG. 5B is an outline of a contour line sketch of a scanning electron micrograph of the permalloy nanomagnet having the experimental anisotropy profile shown in FIG. 5A.

A comparison of the effect of concavity depth is illustrated in the next few Figures. FIG. 5A is an experimental anisotropy profile of a substantially square shaped permalloy nanomagnet 32 having no concavities as shown in FIG. 5B. As depicted in the experimental anisotropy profile (FIG. 5A), a magnetically easy axis EA is formed along a diagonal that extends roughly from one corner of the nanomagnet 32 to another corner of the nanomagnet 32. A magnetically hard axis HA exists roughly perpendicular to the magnetically easy axis EA.

Figure 6A:
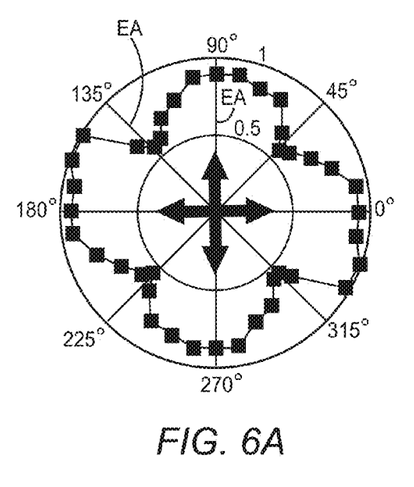
FIG. 6A is an experimental anisotropy profile of a permalloy concave nanomagnet having a substantially square shape with 10 nm deep concavities.
Figure 6B:
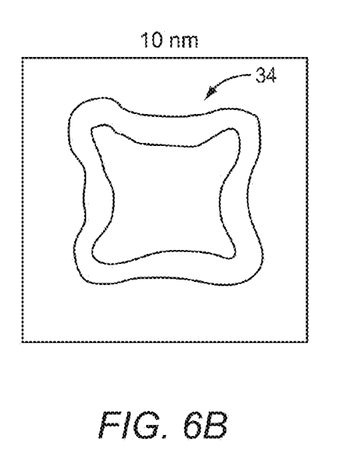
FIG. 6B is an outline of a contour line sketch of a scanning electron micrograph of the permalloy nanomagnet having the experimental anisotropy profile shown in FIG. 6A.

FIG. 6A is an experimental anisotropy profile of a substantially square shaped permalloy nanomagnet 34 having 10 nm concavities as shown in FIG. 6B. Notice that the magnetically easy axis and magnetically hard axis are now rotated to roughly bisect the 10 nm concavities.

Figure 7A:
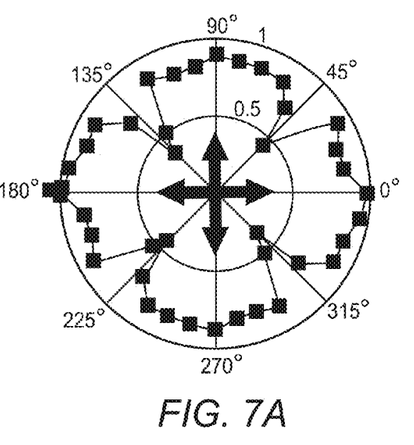
FIG. 7A is an experimental anisotropy profile of a permalloy concave nanomagnet having a substantially square shape with 20 nm deep concavities.
Figure 7B:
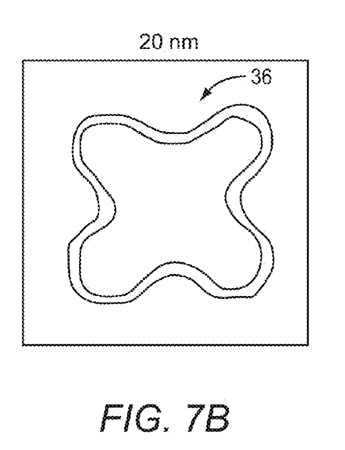
FIG. 7B is an outline of a contour line sketch of a scanning electron micrograph of the permalloy nanomagnet having the experimental anisotropy profile shown in FIG. 7A.

FIG. 7A is an experimental anisotropy profile of a substantially square shaped permalloy nanomagnet 36 having 20 nm concavities as shown in FIG. 7B. Similar to the exemplary 10 nm concavity case of FIG. 6B, the magnetically easy axis and magnetically hard axis roughly bisect the 20 nm concavities.

Figure 8:
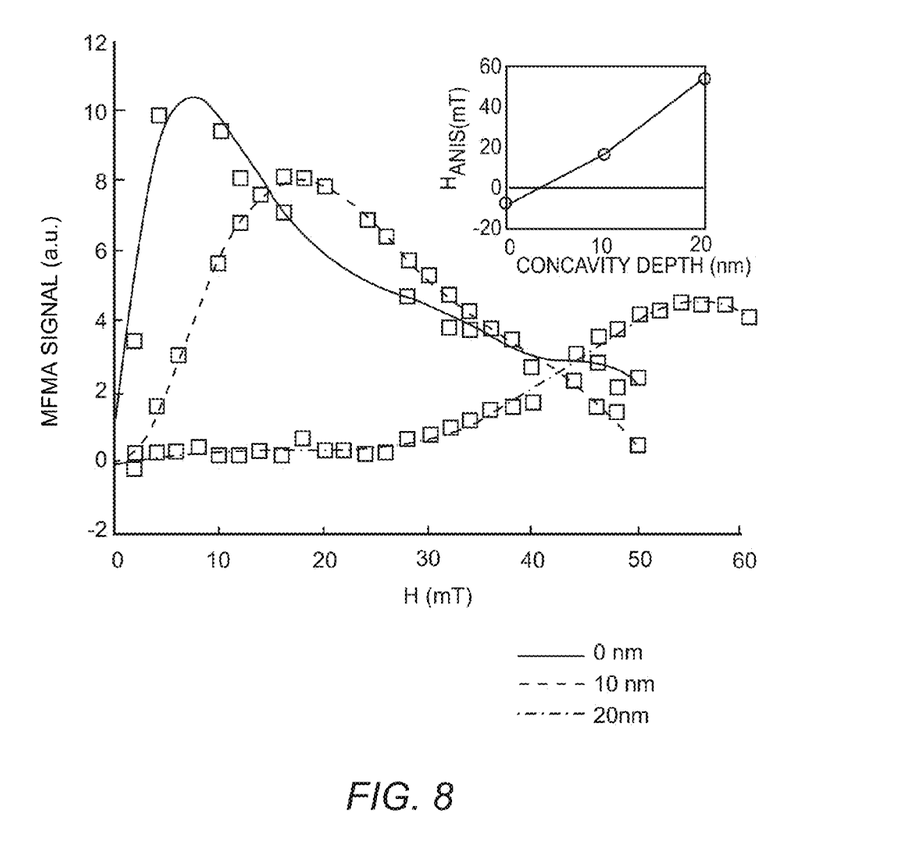
FIG. 8 is a graph comparing anisotropy of permalloy nanomagnets having 0 nm, 10 nm, and 20 nm concavities, respectively.

FIG. 8 is a graph comparing anisotropy of permalloy magnets having 0 nm, 10 nm, and 20 nm concavities, respectively. In particular, the graph plots MFMA signal in a.u. versus applied field (H) in milliTesla (mT). An inset plot associated with FIG. 8 of applied magnetic field ($H_{ANIS}$) versus concavity depth shows that the measured strength of the anisotropy in nanomagnets as a function of concavity depth is widely tunable.

Figure 9A:
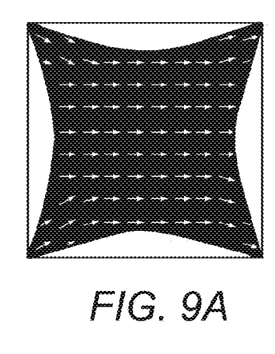
FIG. 9A depicts a concave square magnetization along a magnetically easy axis of 0°.
Figure 9B:
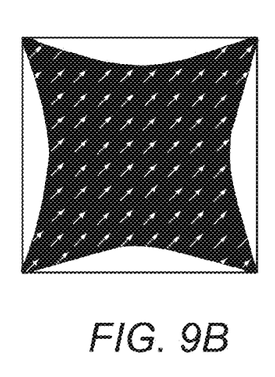
FIG. 9B shows that regions of the high demagnetization energy are concentrated intensely in the upper left and lower right corners of the a nanomagnet when a concave square is magnetized along the hard axis of 45°.

In association with the above results, micromagnetic simulations using object oriented micro magnetic framework (OOMMF) software were carried out to investigate the origins of configurational anisotropy enhancement in concave nanomagnets. FIGS. 9A, 9B, 9C, and 9D compare magnetization patterns of normal and concave square nanomagnets when magnetized along both 0° and 45° axes. When magnetized along magnetically easy axes, the nanomagnets were allowed to relax to their stable configuration, and along the magnetically hard axes, the nanomagnets were held fixed with uniform magnetization. FIGS. 10A, 10B, 10C, and 10D show a distribution of demagnetization energy density for each configuration. A high demagnetization energy density arises from magnetic charge accumulation at the surface of the nanomagnets. FIG. 9A depicts a concave square magnetization along a magnetically easy axis of 0°. FIG. 10A in association with FIG. 9A shows that regions of the high demagnetization energy are located on opposite sides of the concave square. This indicates that the magnetic charges are well separated. Conversely, FIG. 10B associated with FIG. 9B shows that regions of the high demagnetization energy are concentrated intensely in the upper left and lower right corners of the a nanomagnet when a concave square is magnetized along the hard axis of 45°. This indicates that the large concentration of magnetic charge of opposite polarity accumulates in close proximity to each other as a result of a constricted geometry near the corners. Further narrowing of the nanomagnets corners by increasing the concavity depth would continue to increase the total demagnetization energy of the 45° magnetization state.

Figure 9C:
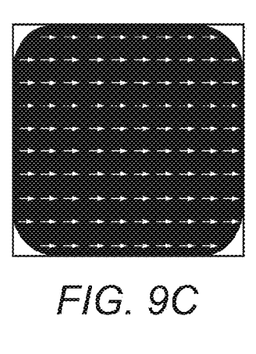
FIG. 9C depicts a square nanomagnet without concavities with magnetized along its hard axis at 0°.
Figure 10A:
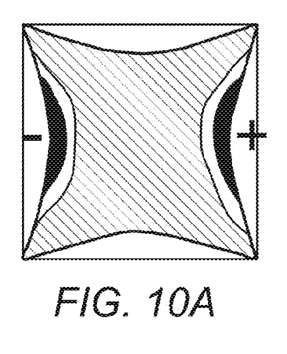
FIG. 10A in association with FIG. 9A shows that regions of the high demagnetization energy are located on opposite sides of the concave square.
Figure 10B:
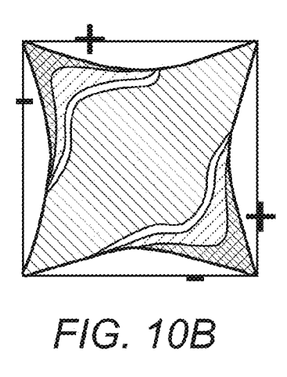
FIG. 10B associated with FIG. 9B shows that regions of the high demagnetization energy are concentrated intensely in the upper left and lower right corners of the concave square nanomagnet when the concave square is magnetized along the hard axis of 45°.
Figure 10C:
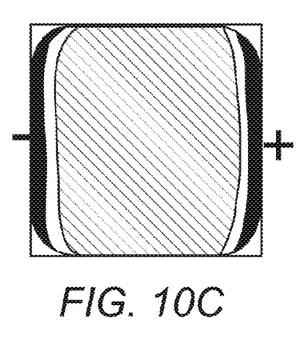
FIG. 10C in association with FIG. 9C shows that there remains a relatively large distance between uncompensated spins for a nanomagnet without concavities.

For comparison, FIG. 9C depicts a square nanomagnet without concavities that is magnetized along its hard axis at 0°. FIG. 10C associated with FIG. 9C shows that there remains a relatively large distance between the uncompensated spins for a nanomagnet without concavities.

Figure 9D:
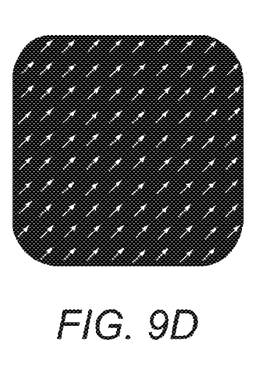
FIG. 9D depicts a square nanomagnet without concavities with magnetization oriented at 45°.
Figure 10D:
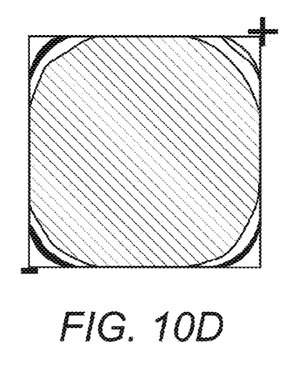
FIG. 10D in association with FIG. 9D shows an outward bowed magnetization configuration that concentrates magnetic charges in opposite corners.

FIG. 9D depicts a square nanomagnet without concavities that has a magnetization oriented at 45°. FIG. 10D in association with FIG. 9D shows an outward bowed magnetization configuration that concentrates magnetic charges in opposite corners, where the magnetic charges are the furthest apart from each other. The maximal separation between opposing charges means the diagonal axis is a magnetically easy axis. Overall, the difference in demagnetization energy between the magnetically easy and magnetically hard axes of the square nanomagnet without concavities is significantly smaller than that of a concave square. Thus, configurational anisotropy is greatly enhanced in concave nanomagnets in comparison to traditional geometries such as square nanomagnets.

Figure 11:
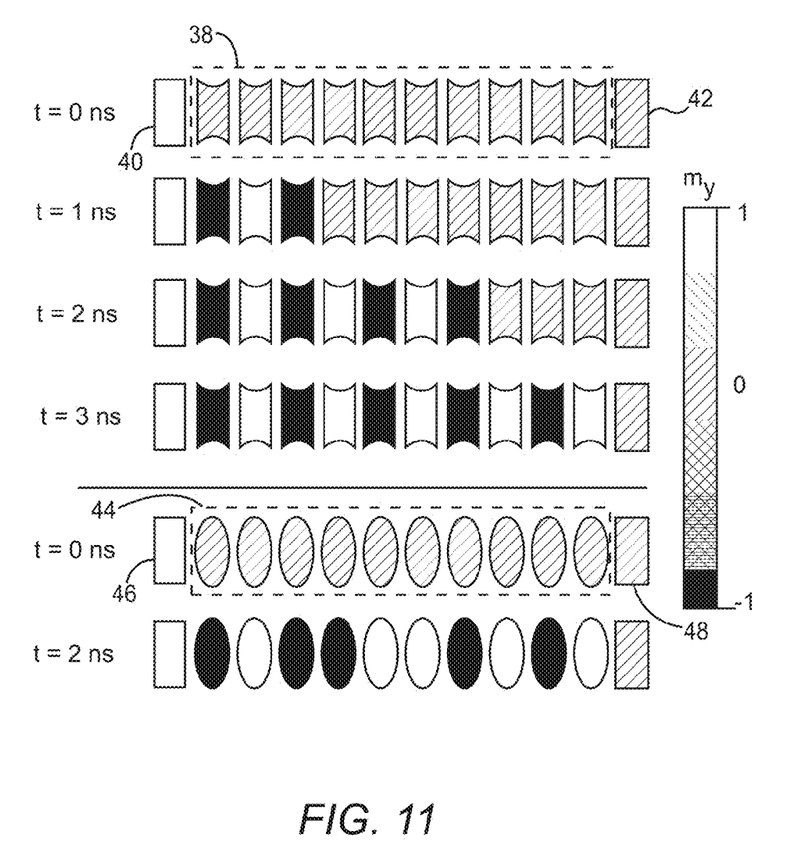
FIG. 11 is a diagram showing results of micromagnetic simulations that predict information in a nanomagnets logic circuit with biaxial anisotropy will propagate in a characteristic cascade like manner.

FIG. 11 is a diagram showing results of micromagnetic simulations that predict information in a nanomagnets logic circuit with biaxial anisotropy will propagate in a characteristic cascade like manner. The micromagnetic simulations verify that this mode of signal propagation occurs in chains of concave nanomagnets. A simulated chain of nanomagnets 38 are situated between a between an input magnet 40 and an output magnet 42. For comparison, a chain of elliptical nanomagnets 44 with equivalent dimensions is also simulated. The elliptical nanomagnets 44 are similarly situated between an input magnet 46 and an output magnet 48. In both simulations, the input magnet 40 and input magnet 46 are fixed in the vertical direction to set the desired output state of the chain of concave nanomagnets 38 and the chain of elliptical nanomagnets 44, respectively. Moreover, the output magnet 42 and the output magnet 48 are both fixed to the horizontal direction to stabilize the last one of the chain of concave nanomagnets 38 and the last one of the chain of elliptical nanomagnets 44, respectively. The chain of concave nanomagnets 38 and the chain of elliptical nanomagnets 44 are both initialized along the horizontal axis by an applied magnetic field of 150 mT, which is removed linearly over the first 1 ns of each simulation time to initialize signal propagation. The temperature parameter in the simulation is set to 300° K. Each of the concave nanomagnets 38 remains magnetized in its metastable state along the horizontal axis until its nearest adjacent one of concave nanomagnets 38 flips and produces a dipole field in the vertical direction. This action gives rise to a predicted cascade like magnetic signal propagation behavior. By contrast, the chain of elliptical nanomagnets 44 through stochastic thermal processes cause at least some of the elliptical nanomagnets 44 to flip to the vertical axis too rapidly for the information from the input magnet to propagate reliably down the chain of elliptical nanomagnets 44. As a result, some of the elliptical nanomagnets 44 flip to a logically incorrect state that is typically parallel to a nearest adjacent one of the elliptical nanomagnets 44. Simulations carried out using nanomagnets with different concavity shapes, e.g., with rounded rather than pointed ends, exhibited similar cascade-like signal propagation behavior.

Photoelectron emission microscopy (PEEM) experiments verified the unique behavior of chains of concave nanomagnets. Magnetic circular dichroism of circularly polarized x-rays was used to generate magnetic contrast images with sensitivity along the magnetically easy axes of the nanomagnets. Magnetic contrast images of a chain of concave nanomagnets having concavity depths of 40 nm, 30 nm, and 20 nm, respectively were taken. The nanomagnet dimensions were 80 nm×160 nm with 10 nm thickness. The concavity depth was varied between 20 and 40 nm. Prior to magnetic imaging, a 220 mT magnetic field was applied along the horizontal axis of the chain and subsequently removed over 30 seconds. The sample was then inserted into the PEEM chamber and magnetic contrast images were taken. The results of the PEEM experiments suggest that nanomagnets with 20 nm concavity depth were not sufficiently stabilized along the horizontal axis by biaxial anisotropy; all the nanomagnets flip to the vertical axis, but errors (nearest neighbors aligned parallel to one another) were observed in the output state of the chain. On the other hand, nanomagnets with 40 nm concavity depth did not flip to the vertical axis at all (the lack of magnetic contrast indicates horizontal magnetization). This implies that the biaxial anisotropy was strong relative to the uniaxial anisotropy, so the magnets remained locked in the horizontal direction. Finally, nanomagnets with 30 nm concavity depth demonstrate an appropriate balance of biaxial and uniaxial anisotropy, as error-free signal propagation occurs along the first seven nanomagnets in the chain.

Figure 12:
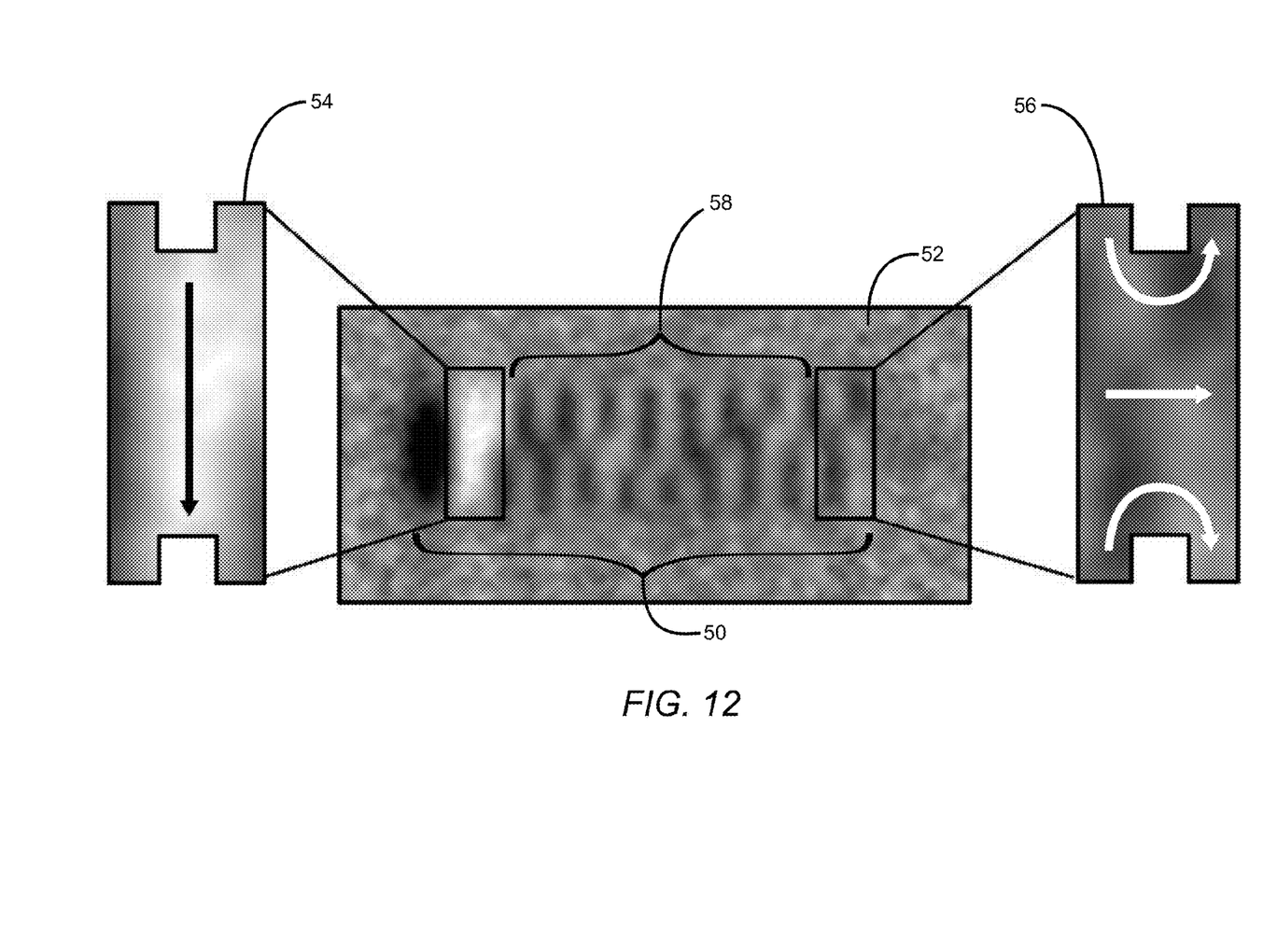
FIG. 12 is a scanning electron micrograph that provides observation of subdomain magnetization that includes a zipper-like pattern resulting from configurational anisotropy.

FIG. 12 is a PEEM micrograph that provides observation of subdomain magnetization. In particular, FIG. 12 shows a chain of concave nanomagnets 50 disposed on a substrate 52. A single concave nanomagnet 54 shown in a cutaway view has a first magnetically easy axis shown by a longitudinally aligned black arrow. In this exemplary case, a magnetization of the concave nanomagnet 54 is substantially aligned with the first magnetically easy axis as denoted by a relatively large and uniform light region that is in contrast with adjacent nanomagnets and substrate 52. If the magnetization of the concave nanomagnet 54 was to flip polarity the contrast would be denoted by a relatively large and uniform dark region. Another concave nanomagnet 56 shown in a cutaway view has subdomain magnetization that is not fully uniform due to the magnetization attempting to align with a second magnetically easy axis denoted by a latitudinally aligned straight white arrow. Curved white arrows denote the magnetization of subdomains at either ends of the concave nanomagnet 56 due to configurational anisotropy. Note that a zipper-like pattern 58 forms when adjacent ones of the chain of concave nanomagnets 50 each have subdomain magnetization that is not substantially uniform. A concave nanomagnet such as the concave nanomagnet 54 is typically made up of a magnetic particle that has a width that ranges from around 120 nm to 180 nm. Moreover, concave nanomagnets such as the concave nanomagnet 54 typically have an aspect ratio (i.e., length/width) of around 2 to 3.

Figure 13:
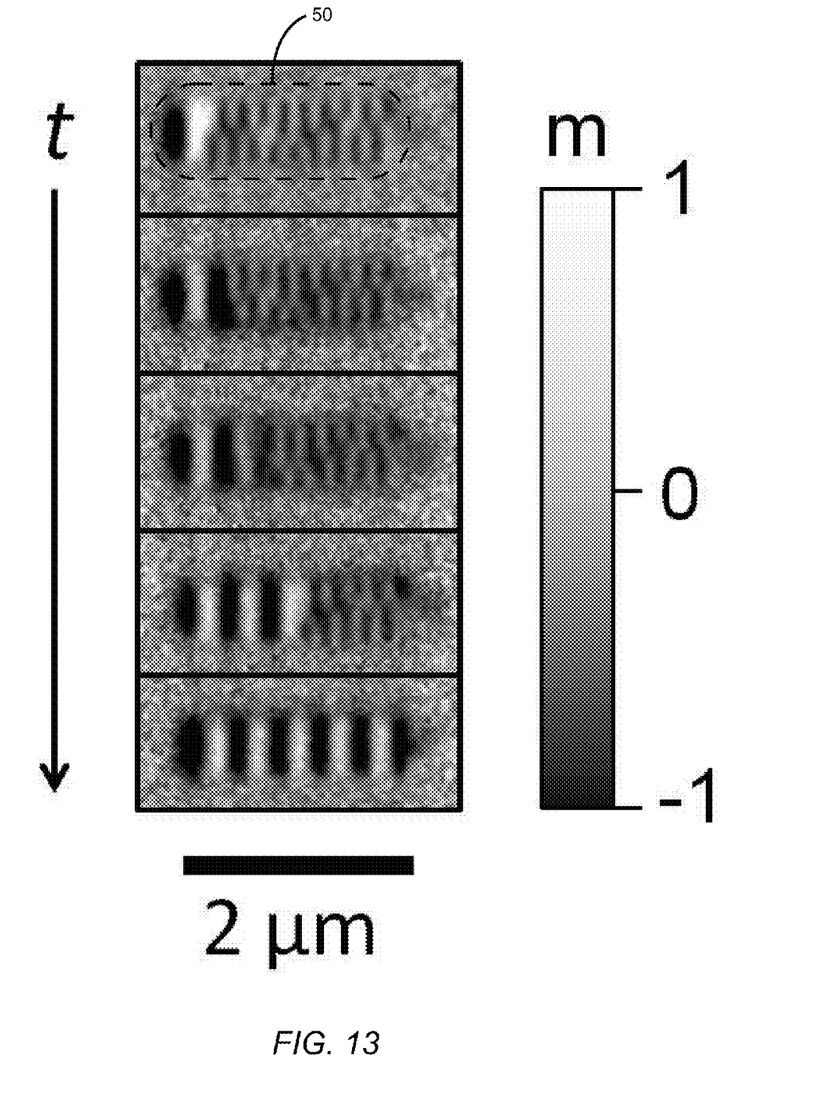
FIG. 13 is a composite of scanning electron micrographs that illustrates cascade-like signal dynamics that are attributable to configurational anisotropy.

Further confirmation of the intended behavior of concave nanomagnets was achieved by increasing the temperature of the nanomagnet chains while inside the PEEM chamber. FIG. 13 is a composite of PEEM micrographs that illustrates cascade-like signal dynamics that are attributable to configurational anisotropy. To verify that the horizontal magnetization of the concave nanomagnet chain 50 is in a metastable state rather than a global energy minimum state the temperature of the sample was raised to 120° C. using a heating filament inside a sample stage of the PEEM chamber. The increase in thermal energy allows the each of the concave nanomagnets in the concave nanomagnet chain 50 to hop over the biaxial anisotropy energy barriers and permanently flip out of the metastable state. The final (i.e., bottom) magnetic contrast image shown in FIG. 13 confirms that the heated chain no longer remains locked along the horizontal axis and instead flips to the vertical axis, with anti-parallel nearest-neighbor alignment.

This disclosure demonstrates the use of concave shapes to achieve tunable control of the anisotropy properties of nanomagnets for nanomagnetic logic applications. One of its key advantages over other means of anisotropy control is that it is induced by top-down lithography and can be fabricated using well-characterized processes like permalloy lift-off. Further exploration of the nanomagnet shape space in search of useful anisotropy properties will be fruitful for additional nanomagnetic applications. For example, a nanomagnet in which the easy axis is the same as the original convex shape but different in strength is also within the scope of the present disclosure. For instance, if a rectangle were to have concavities along its long edges rather than the short edges, the strength of the magnetically easy axis would be enhanced but not offset in direction. This could be useful for stabilizing magnetic memory devices, among other things.

Concavity induced anisotropy offers a powerful new degree of freedom for controlling the anisotropy profile of nanoscale magnetic elements by top-down fabrication methods. Combined with conventional shape anisotropy, concavity induced anisotropy allows for broad control of both uniaxial and the biaxial anisotropy parameters in a single nanomagnet. This form of capability has important device applications in nanomagnetic logic, allowing for faster and more reliable computations than can be carried out with shape anisotropy alone. Further applications of concave nanomagnets might be found in future storage, memory, and biomedical devices. The present experimental investigation is focused on permalloy nanomagnets because they lack magneto crystalline anisotropy and they are relatively easy to fabricate using known integrated circuit manufacturing processes. However, it is to be understood that patterning concave nanomagnets made of materials with intrinsic anisotropy is within the scope of the present disclosure. Therefore, concave nanomagnets made of materials with intrinsic anisotropy are likely to lead to potentially interesting superpositions of shape induced anisotropy and intrinsic anisotropy.

Those skilled in the art will recognize improvements and modifications to the embodiments of the present invention. All such improvements and modifications are considered within the scope of the concepts disclosed herein and the claims that follow.

What is claimed is:

1. A nanomagnet having tunable anisotropy comprising a magnetic particle with a convex shape having a first magnetically easy axis, wherein the convex shape is modified to include at least one concavity to urge a second magnetically easy axis to form substantially offset from the first magnetically easy axis that is a longitudinal axis that substantially bisects the at least one concavity.

2. The nanomagnet of claim 1 wherein the convex shape is rectangular or substantially rectangular.

3. The nanomagnet of claim 1 wherein the magnetic particle has dimensions of around 80 nm×120 nm.

4. The nanomagnet of claim 3 wherein a depth for the concavity ranges from around 20 nm to around 40 nm.

5. The nanomagnet of claim 3 wherein the magnetic particle has a thickness of around 10 nm.

6. The nanomagnet of claim 1 wherein the magnetic particle is made of a Fe—Ni based alloy.

7. The nanomagnet of claim 6 wherein the convex shape is a rectangle having concavities in all sides.

8. The nanomagnet of claim 7 wherein anisotropy strength is enhanced to around 700% over square magnetic particles without concavities.

9. The nanomagnet of claim 6 wherein the square has a width of around 150 nm and a thickness of around 15 nm with a biaxial anisotropy field of around 300 Oersted.

10. An apparatus for propagating magnetic signals comprising:
a substrate; and
a chain of nanomagnets each comprising a magnetic particle with a convex shape having a first magnetically easy axis that is a longitudinal axis, wherein the convex shape is modified to include at least one concavity to urge a second magnetically easy axis to form substantially offset from the first magnetically easy axis that substantially bisects the at least one concavity, wherein the chain of nanomagnets is fabricated on the substrate wherein each of the chain of nanomagnets is separated by a distance that is close enough to allow a magnetization change in one of the chain of nanomagnets to cause adjacent ones of the chain of nanomagnets to change magnetization, thereby propagating a magnetic signal.

11. The apparatus of claim 10 wherein the convex shape is rectangular or substantially rectangular.

12. The apparatus of claim 10 wherein the magnetic particle has dimensions of around 80 nm×120 nm.

13. The apparatus of claim 12 wherein a depth for the concavity ranges from around 20 nm to around 40 nm.

14. The apparatus of claim 12 wherein the magnetic particle has a thickness of around 10 nm.

15. The apparatus of claim 10 wherein the magnetic particle is made of a Fe—Ni based alloy.

16. The apparatus of claim 15 wherein the convex shape is a square having concavities in all sides.

17. The apparatus of claim 16 wherein anisotropy strength is enhanced to around 700% over square magnetic particles without concavities.

18. The apparatus of claim 15 wherein the square has a width of around 150 nm and a thickness of around 15 nm with a biaxial anisotropy field of around 300 Oersted.

19. The apparatus of claim 10 wherein the magnetic particle has a length that ranges from around 120 nm to around 180 nm.

20. The apparatus of claim 10 wherein the magnetic particle has an aspect ratio that ranges from around 2 to around 3.

21. The apparatus of claim 10 wherein a zipper-like pattern forms when adjacent ones of the chain of concave nanomagnets each have subdomain magnetization that is not substantially uniform.

22. A nanomagnet having tunable anisotropy comprising a magnetic particle with a convex shape having a longitudinal axis and a first magnetically easy axis that is substantially parallel with the longitudinal axis, wherein the convex shape is modified to include at least one concavity to urge a second magnetically easy axis to form substantially in alignment with the longitudinal axis and having a magnetic strength substantially different from the first magnetically easy axis.

23. The nanomagnet of claim 22 wherein the convex shape is rectangular or substantially rectangular.

24. The nanomagnet of claim 22 wherein the magnetic particle has dimensions of around 80 nm×120 nm.

25. The nanomagnet of claim 24 wherein a depth for the concavity ranges from around 20 nm to around 40 nm.

26. The nanomagnet of claim 24 wherein the magnetic particle has a thickness of around 10 nm.

27. The nanomagnet of claim 22 wherein the magnetic particle is made of a Fe—Ni based alloy.

* * * * *